United States Patent [19]

Anzai et al.

[11] 4,288,729
[45] Sep. 8, 1981

[54] CONTROL SYSTEM FOR D.C. ELECTRIC MOTOR

[75] Inventors: Nobuo Anzai; Eiki Watanabe, both of Inazawa, Japan

[73] Assignee: Mitsubishi Denki Kabushiki Kaisha, Tokyo, Japan

[21] Appl. No.: 130,684

[22] Filed: Mar. 17, 1980

[30] Foreign Application Priority Data

Mar. 19, 1979 [JP] Japan .................................. 54/31984

[51] Int. Cl.³ ............................................. H02P 5/16
[52] U.S. Cl. ........................... 318/345 C; 318/345 G; 318/505
[58] Field of Search ............... 318/345 C, 345 G, 505; 363/39, 40, 42, 44, 43, 45, 46, 47, 48; 361/58, 111; 328/165, 166, 167

[56] References Cited

U.S. PATENT DOCUMENTS

| 3,555,361 | 1/1971 | Hallberg | 361/58 |
| 3,873,854 | 3/1975 | Lamp | 361/58 |
| 4,051,545 | 9/1977 | Kloss | 361/58 |
| 4,158,864 | 6/1979 | Kennon | 361/58 |

Primary Examiner—David Smith, Jr.
Attorney, Agent, or Firm—Sughrue, Mion, Zinn, Macpeak and Seas

[57] ABSTRACT

A control system for a D.C. electric motor utilizing a Ward-Leonard rotation speed control system in which noise components in the input power to the motor are substantially eliminated. Switching means in the form of gate turning-off thyristors couples a delta-connected capacitance circuit to the input line to the motor between inductors coupled in series with each phase of the input line. Switching means is provided which is opened after a predetermined time delay from the firing time of the thyristor converter. The time delay is preferably approximately one-fourth of the system natural oscillation period.

5 Claims, 13 Drawing Figures

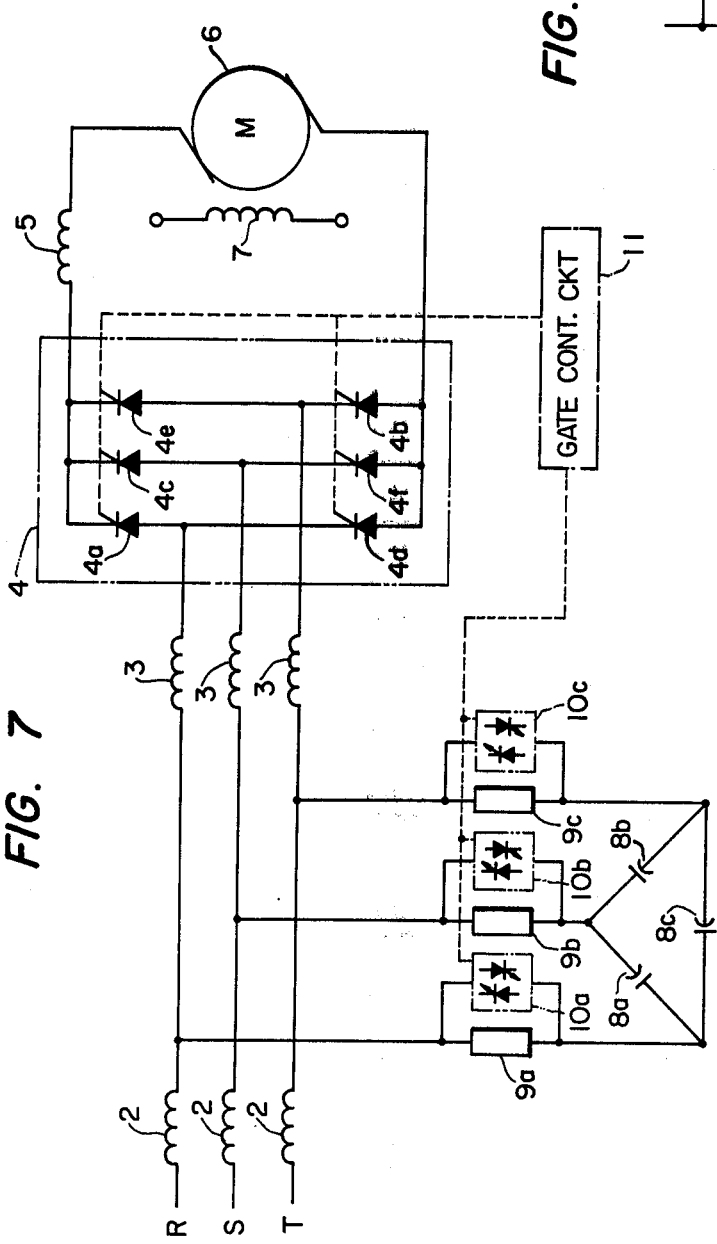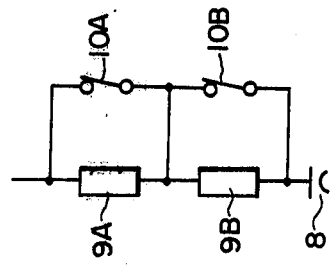

CONTROL SYSTEM FOR D.C. ELECTRIC MOTOR

BACKGROUND OF THE INVENTION

The present invention relates to an improved control system utilizing thyristors for controlling a D.C. electric motor.

Heretofore, static Ward-Leonard systems have been employed as rotation speed control systems for electric motors. One embodiment of such a rotation speed control system is shown in FIG. 1. The conventional rotation speed control system, as shown in FIG. 1, includes a three-phase transformer for supplying A.C. power for which the phases are designated by reference characters R, S and T, respectively; power supply-side reactances 2 each having a reactant value of $L_1$; static Ward-Leonard side A.C. reactors $L_3$ each having a reactance value of $L_2$; a thyristor converter including thyristors 4a through 4f; a D.C. reactor 5; an armature 6 of a D.C. electric motor M; and a field winding 7. Generally, while a thyristor converter 4 including a pair of forward and reverse thyristor converters is customarily employed, in order to simplify the schematic diagram shown in FIG. 1, there is shown only one of the forward and reverse thyristor converters. This conventional rotation speed control system is well-known in the art and therefore a description of the operation thereof is omitted.

FIG. 2 is a schematic diagram showing a waveform of a power supply voltage appearing at a point A on an input side of the thyristor converter 4 shown in FIG. 1 with the thyristor firing angle being approximately 90°. In FIG. 2, reference character T represents a period of time corresponding to a commutation overlapping angle. The depth of the voltage notch at the time of commutation is defined by the ratio of $L_1$ to $L_2$. Accordingly, the following expression can be obtained.

$$(E_1/E_0) = (L_2/L_1 = L_2),$$

where $E_0$ is the maximum voltage value and $E_1$ the notch voltage value.

In the case where A.C. power is supplied by an emergency generator during an interruption of the normal power source, due to the fact that the power supply-side reactance value $L_1$ of the emergency generator is relatively large, the notch voltage $E_1$ becomes very small and consequently, the depth of the voltage notch becomes quite deep. In addition, assuming that a circuit element, and more particularly a circuit element including a uni-junction transistor sensitive to the voltage notch, is coupled to the point A, the voltage notch causes erroneous operation of the circuit element.

In order to make the voltage notch smaller, as is clear from the above-mentioned expression, the reactance value $L_2$ is made larger. In this case, however, this brings about an accompanying disadvantage in that the size of the A.C. reactor 3 is increased resulting in an increase in the communication failure of the thyristors 4a through 4f and the like.

FIG. 3 is a schematic diagram showing a second conventional control system for a D.C. electric motor which was developed to eliminate the above-noted drawbacks. In FIG. 3, coupled to the input side of the thyristor converter 4 is a capacitor 8 provided for eliminating the above-described voltage notch. However, resonance may be caused by a combination of the reactances $L_1$ and $L_2$ and the electrostatic capacitance C. The resultant voltage at the input side of the thyristor converter 4 has a waveform as shown in FIG. 4. Accordingly, the circuit element coupled to the point A is subjected to a noise component included in the resultant voltage.

SUMMARY OF THE INVENTION

A primary object of this invention is thus to provide a control system for a D.C. electric motor which ameliorates or eliminates the above-described difficulties and which is capable of reducing noise components in the output waveform of a power supply voltage even if a capacitor is coupled to the input side of a thyristor converter thereof.

In accordance with this and other objects of the invention, there is provided a control system for D.C. electric motors including a thyristor converter, a gate control circuit for controlling a firing time of said thyristor converter, capacitor means connected through resistor means to an input side of said thyristor converter, and switching means coupled in parallel with the resistor means wherein the switching means is opened after a predetermined time delay from the firing time of the thyristor converter. The time delay is preferably approximately one-fourth of a system free oscillation period defined by a reactance in the input side of the thyristor converter and the capacitance means. The switching means is preferably a gate turning-off thyristor. The system of the invention is particularly suited for use with a three-phase system in which the capacitance means is provided as three capacitors connected in a delta configuration.

BRIEF DESCRIPTION OF THE DRAWINGS

In the accompanying drawings:

FIG. 7 is a schematic circuit diagram showing a first preferred embodiment of a control system for a D.C. electric motor according to this invention;

FIG. 9 is an explanatory diagram for describing a principle of a second embodiment of this invention.

DESCRIPTION OF THE PREFERRED EMBODIMENTS

A preferred embodiment of a control system applicable to a traction motor of an elevator system according to this invention will be described with reference to FIGS. 5 through 8. Initially, a principle of this invention will be described with reference to FIGS. 5 and 6.

Figure 1:
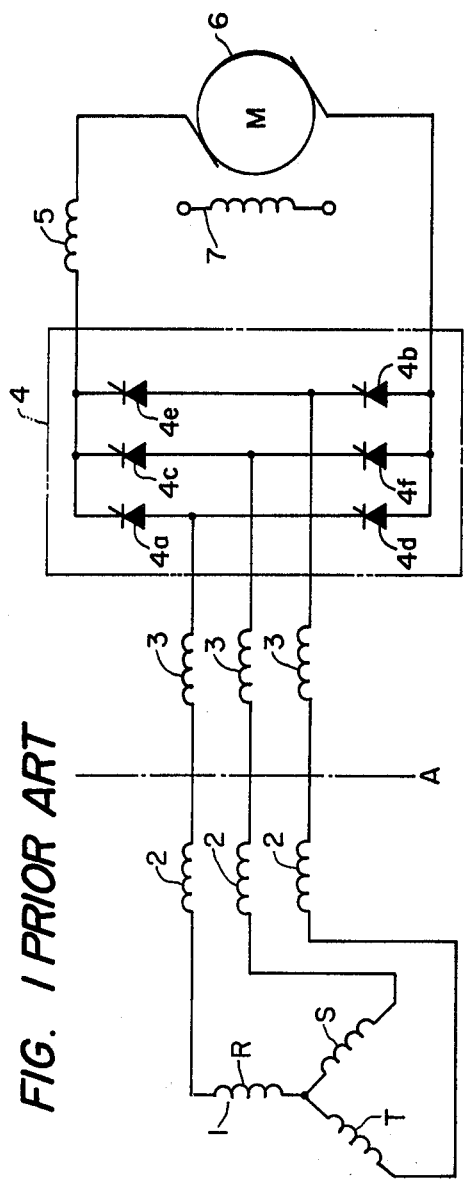
FIG. 1 is a schematic circuit diagram showing a conventional control system for a D.C. electric motor.
Figure 2:
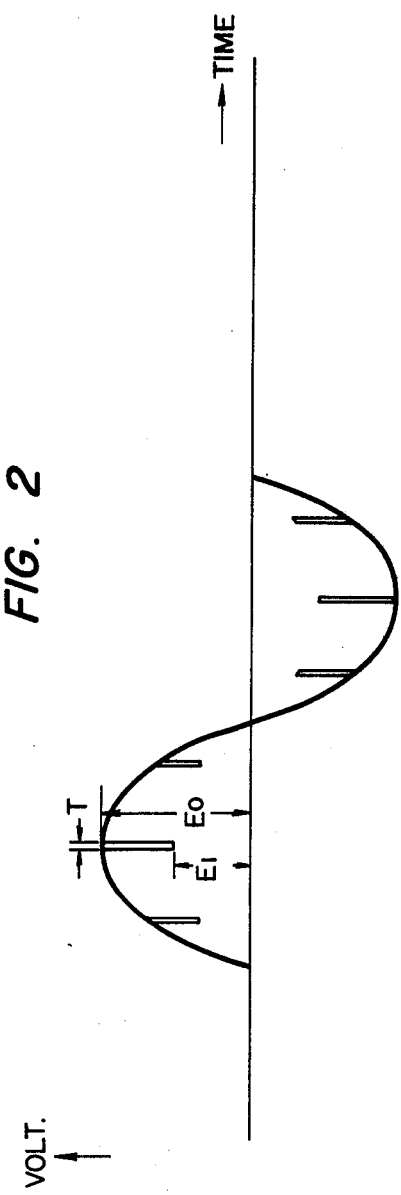
FIG. 2 is a diagram showing a waveform of a power supply voltage in the control system shown in FIG. 1.
Figure 3:
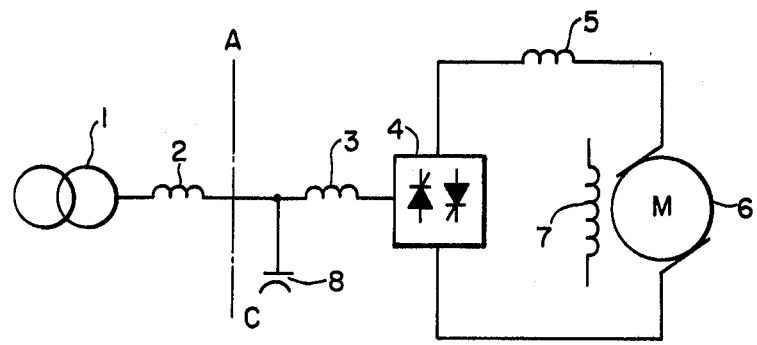
FIG. 3 is a schematic circuit diagram showing a modified conventional control system for a D.C. electric motor.
Figure 4:
FIG. 4 is a diagram showing a waveform of a power supply voltage in the control system shown in FIG. 3.
Figure 5:
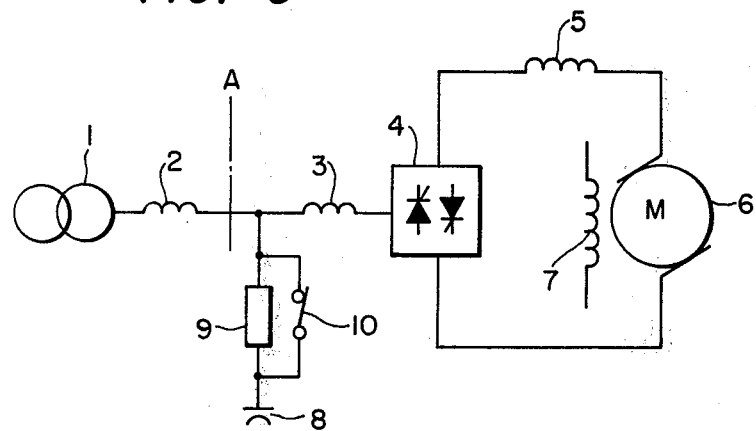
FIG. 5 is simplified explanatory schematic diagram for describing a principle of a control system for a D.C. electric motor according to this invention.

In FIG. 5, the circuit elements that are the same as those of FIG. 3 bear the same reference numerals and operate in the same manner. However, the system of FIG. 5 additionally includes a parallel circuit of a resistor 9 and a switching element 10 which is coupled between the input side of the thyristor converter 4 and a capacitor 8.

Figure 6:
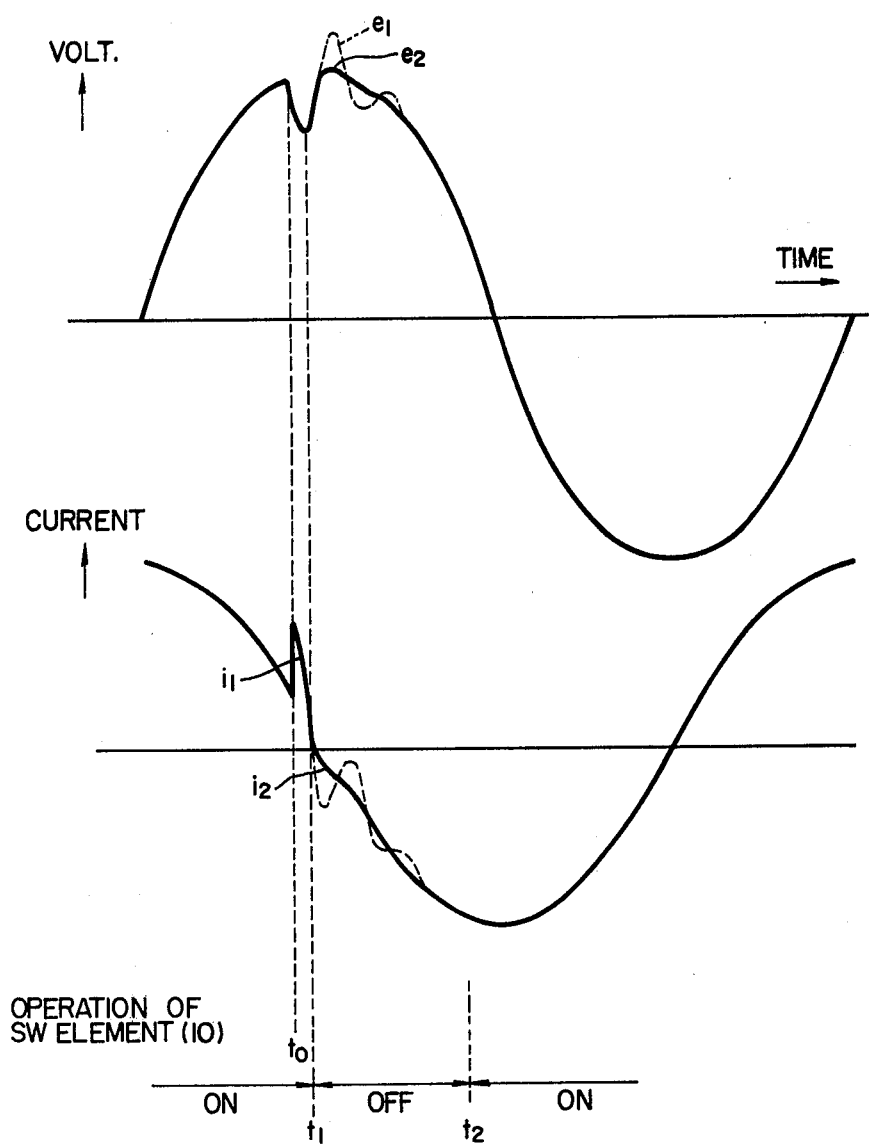
FIG. 6 is a diagram showing waveforms of power supply voltage and current in the control system shown in FIG. 5.

FIG. 6 is a diagram showing waveforms of an input voltage and an input current applied to the control system shown in FIG. 5 where reference characters $e_1$ designates the waveform of an A.C. input voltage including a noise component, $e_2$ the waveform of the A.C. input voltage in which the noise components have been suppressed, $i_1$ the waveform of an A.C. charging current including a noise component, $i_2$ the waveform of the A.C. charging current in which the noise component has been suppressed, $t_0$ an initial time of commutation of the thyristor converter 4, $t_1$ an opening time of the switching element 10, and $t_2$ a closing time of the switching element 10. It should be noted that, as shown in FIG. 7, the capacitor 8 is actually composed of three capacitors coupled in a delta configuration, the simplified diagram of FIG. 5 being provided for clarity of explanation.

The switching element 10 is maintained in a closed condition until commutation in the thyristor converter 4 has been initiated. The switching element 10 is then opened at the time $t_1$ after a short time delay from the commutation initiation time $t_0$ as a result of which the bypass through the switching element 10 is interrupted thereby connecting the resistor 9 to the capacitor 8. Consequently, the voltage waveform changes to that indicated by $e_2$ and therefore the charging current has at that time a waveform indicated by $i_2$. It is preferable that the interval between $t_0$ and $t_1$ be set to be approximately one-fourth of the free oscillation period dependent on the reactances $L_1$ and $L_2$ and the electrostatic capacitance C. The switching element 10 continues to be in the open state until the initiation of the next commutation operation. The open period of time $(t_2-t_1)$ during which the switching element 10 is open must be less than 60°.

FIG. 7 is a schematic circuit diagram showing a first preferred embodiment of a control system for a D.C. electric motor according to this invention wherein the circuit elements that are the same as those of FIG. 5 bear the same reference numerals. In FIG. 7, as mentioned above, capacitors 8a-8c are coupled in a delta configuration. Resistors 9a-9c are connected to the junction points between ones of capacitors 8a-8c and switching elements 10a-10c, which each may be a gate turning-off thyristor, are connected in parallel with resistors 9a-9c, respectively. Reference numeral 11 designates a gate control circuit.

Figure 8A:
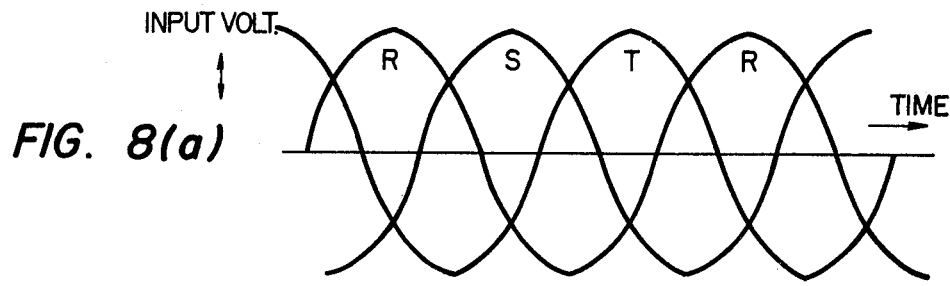
FIG. 8(a) through 8(e) are diagrams showing, respectively, a waveform of an A.C. input voltage applied to a thyristor converter; a waveform of a D.C. output voltage with three-phase full-wave rectification; gate pulses applied to thyristors by a gate control circuit; a conductive state of each of the thyristors in the control circuit; and gate pulse voltages applied to gates of the turn-off thyristors by the gate control circuit.
Figure 8B:
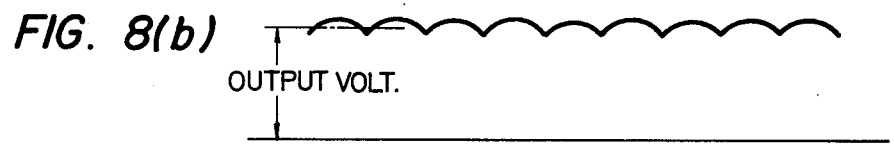
Figure 8C:
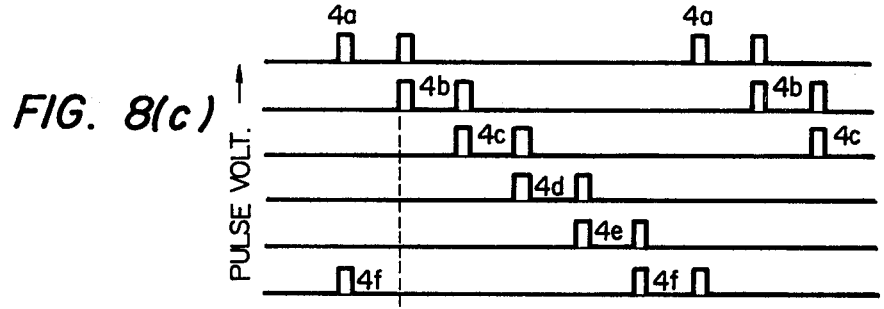
Figure 8D:
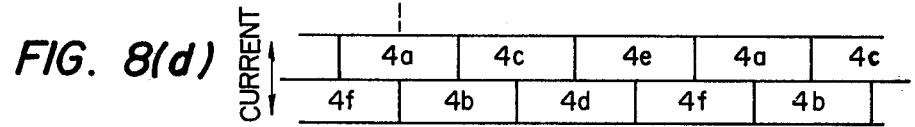
Figure 8E:
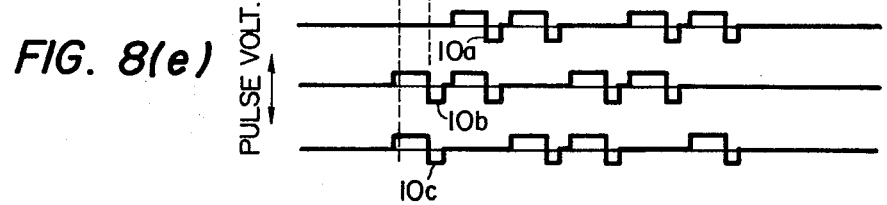

FIGS. 8(a)-(e) are diagrams showing, respectively, a waveform of an A.C. input voltage applied to a thyristor converter 4, a waveform of a D.C. output voltage with three-phase full-wave rectification, gate pulses applied to thyristor 4a through 4f by a gate control circuit 11, a conductive state of each of the thyristor 4a through 4f, and gate pulse voltages applied to gate turn-off thyristors 10a-10c by the gate control circuit 11. As shown in FIG. 8(e), each of the gate turning-off thyristors 10a-10c is rendered conductive upon receiving a positive gate pulse from the gate control circuit whereas each is rendered non-conductive upon receiving a negative gate pulse therefrom.

For example, as is apparent from FIGS. 8(c)-(e), under an assumption that the thyristors 4a and 4f are in conductive states, when a gate pulse is applied to the thyristor 4b, negative gate pulses are applied to the gate turning-off thyristors 10b and 10c after a time delay of $t_1-t_0$ whereby the thyristors 10b and 10c are rendered non-conductive. As a result, the charging current to the capacitor 8b is turned off. It should be noted that the thyristors 10a-10c may be replaced by switching transistors.

FIG. 9 is a schematic diagram showing a modification of the parallel circuit of the resistor 9 and the switching element 10. In FIG. 9, reference numerals 9A and 9B denote resistors with the sum of resistance values of the resistors 9A and 9B being equal to the resistance value of the resistor 9 shown in FIG. 5. Switching elements 10A and 10B are connected in parallel with the resistors 9A and 9B, respectively.

In operation, at the time $t_1$ as indicated in FIG. 6, the switching elements 10A and 10B are simultaneously opened to thereby turn off the charging current to the capacitor 8. Subsequently, at the time $t_2$, the switching element 10A is closed after which the switching element 10B is closed thereby decreasing the rush current to the capacitor 8.

For reducing the rush current, transistors may be used instead of the switching element 10 shown in FIG. 5 with the conductivity of the transistor being controlled to vary gradually.

While embodiments of a preferred embodiment of a control system for a static Ward-Leonard system have been described hereinbefore, the present invention is also more generally applicable to a control system for an apparatus having thyristors in which a voltage notch occurs during commutation. The invention can, for example, be applied to a control system for controlling an electric motor by way of varying the voltage or frequency of the input power to the motor.

As is apparent from the above description, according to this invention, a series-connected combination of a capacitor and resistor is connected to the input side of a thyristor converter with a switching element connected in parallel with the resistor, and the switching element is controlled so as to open after a predetermined time delay from the firing time. As a result, the charging current to the capacitor is turned off thereby minimizing the noise components occuring in the waveform of the input voltage and thereby resulting in the elimination of undesirable interference to other circuit elements.

What is claimed is:

1. A control system for D.C. electric motors comprising: a thyristor converter; a gate control circuit for controlling a firing point of said thyristor converter; capacitor means connected through resistor means to an input side of said thyristor converter; and switching means connected in parallel with said resistor means, said switching means being opened after a predetermined time delay from said firing point of said thyristor converter.

2. The control system as defined in claim 1 wherein said predetermined time delay is approximately one-fourth of a system free oscillation period dependent on a reactance in the input side of said thyristor converter and said capacitance means.

3. The control system as defined in claim 1 or 2 wherein said switching means comprises a gate turning-off thyristor.

4. The control system as defined in either claim 1 or 2 wherein said thyristor converter is coupled to a three-phase power source, wherein said capacitor means comprises three-capacitors coupled in a delta configuration, and wherein said resistor means comprises three resistors, a first terminal of each of said resistors being connected to a corresponding junction point between said capacitors connected in said delta configuration a second terminal of each of said resistors being connected to a corresponding phase of the power source.

5. The control system as defined in either claim 1 or 2 wherein said switching means comprises a plurality of switching devices coupled in series.

* * * * *